United States Patent

Murray

[15] 3,680,187
[45] Aug. 1, 1972

[54] METHOD OF MAKING VALVE DIAPHRAGM

[72] Inventor: Myles N. Murray, Chagrin Falls, Ohio

[73] Assignee: Industrial Electronic Rubber Company, Twinsburg, Ohio

[22] Filed: Aug. 24, 1970

[21] Appl. No.: 66,267

[52] U.S. Cl............29/156.7 R, 264/250, 264/274
[51] Int. Cl............B21k 1/20, B23p 13/00
[58] Field of Search....29/156.7 R, 156.7 A, 157.1 R; 264/275, 250, 274, 271; 251/38, 45, 30

[56] References Cited

UNITED STATES PATENTS

| | | | |
|---|---|---|---|
| 1,858,650 | 5/1932 | Weida | 264/275 X |
| 2,993,676 | 7/1961 | Dahl | 251/45 X |
| 3,270,373 | 9/1966 | Jagger et al. | 264/275 X |
| 3,398,222 | 8/1968 | Kaufman, Jr. et al. | 264/273 X |
| 3,423,062 | 1/1969 | Grayson | 251/45 X |
| 3,593,957 | 7/1971 | Dolter | 251/38 X |

FOREIGN PATENTS OR APPLICATIONS 876,709   9/1961   Great Britain..................251/45

*Primary Examiner*—John F. Campbell
*Assistant Examiner*—Victor A. DiPalma
*Attorney*—Oberlin, Maky, Donnelly & Renner

[57] ABSTRACT

The diaphragm has an axial passage and a radially spaced bleed hole both in a rigid insert about which the flexible body of the diaphragm is molded. The insert is automatically finally indexed to angularly locate the bleed hole in the mold cavity by a non-round interfit of its axial passage with a pin in the cavity, and there are beads formed about ends of such passage and the bleed hole which are crushed by overlying parts of the mold pieces in closing the same for sealing the passage ends against blocking by the molding compound, the latter being injected to the cavity only after such closure.

3 Claims, 4 Drawing Figures

PATENTED AUG 1 1972 3,680,187
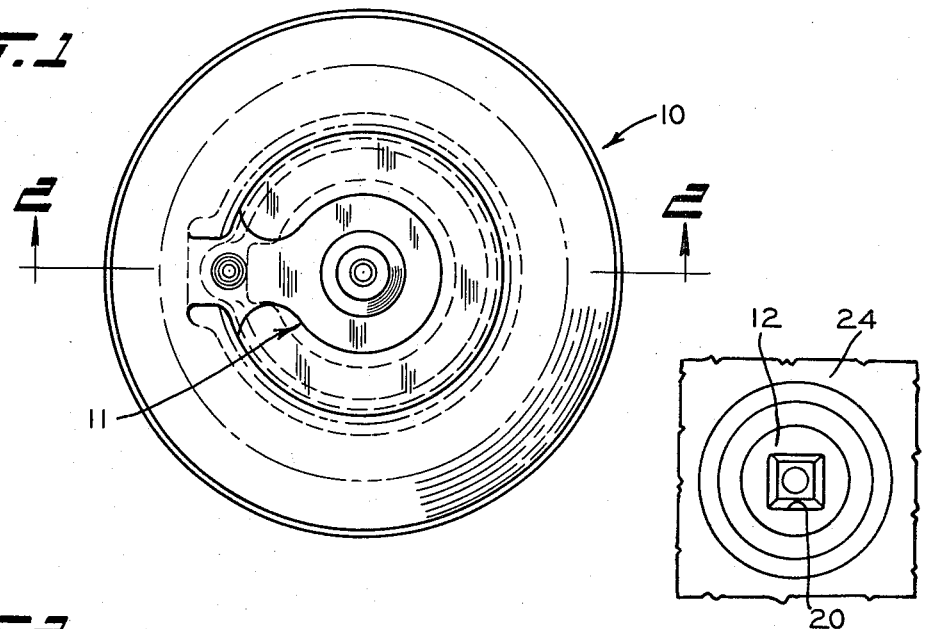
Fig.1
Fig.2
Fig.3
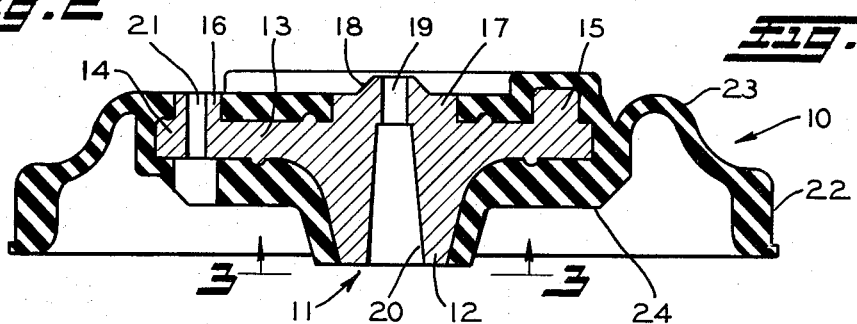
Fig.4
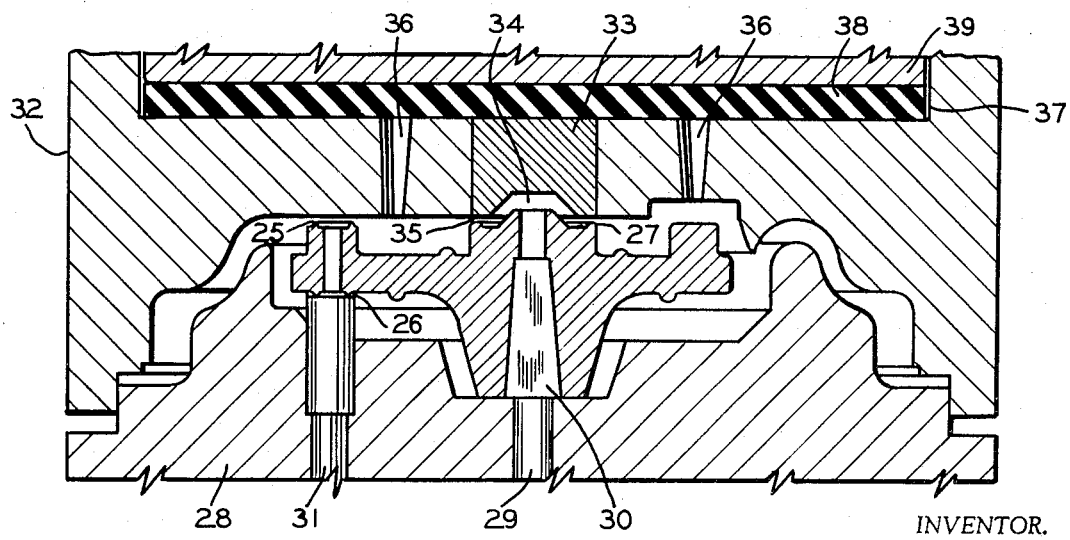
INVENTOR.
MYLES N. MURRAY
BY
Oberlin, Maky, Donnelly & Renner
ATTORNEYS

METHOD OF MAKING VALVE DIAPHRAGM

This invention relates to diaphragms of the type used in solenoid operated water valves and the like, an example of which is shown in U.S. Pat. No. 3,544,062, dated Dec. 1, 1970.

These diaphragms have, as shown in the patent, been formed as a single molded piece of flexible rubber or the equivalent, with a central flow passage and a radially outer bleed hole of appreciably smaller diameter. Such diaphragm is arranged against a valve body outlet, on the same axis, and extends over an annular inlet thereabout at the same side, so that the central passage and bleed hole provide communication from the other side of the diaphragm respectively to the outlet and inlet. There is a liquid chamber at such other side of the diaphragm, and the plunger normally closes the central passage of the diaphragm.

Accordingly, in this normal condition of the valve, the water from the supply can pass through the bleed hole to the opposite diaphragm side to maintain the diaphragm against and closing the central outlet. The valve is opened by solenoid withdrawal of the plunger to unblock the central diaphragm passage and vent the water from the opposite side through the same to the outlet at a much greater rate than that of the inflow through the bleed hole, and the resulting pressure differential lifts the diaphragm away from the outlet to establish the full communication between the same and the inlet. The release of the plunger of course effects a relative reversal of the relation and returns the diaphragm to the normal outlet closing condition.

As further shown in the patent, it has been conventional to employ for the plunger a steel rod having a pointed or conical tip at the lower end which seats in the mouth or upper end of the central diaphragm passage. It has, however, been found that this hard tip and soft seat combination in the conical configuration does not have very good tolerance for dirt and the like, particularly as inevitable wearing occurs over the long periods of use which are now expected of such valves.

It has been proposed to employ a plunger having a soft tip for coaction with a hard orifice in the diaphragm, and this can be realized with a composite diaphragm in which there is a relatively hard or rigid insert incorporated centrally in the flexible body of rubber. The present invention relates to a diaphragm on this order in which such insert moreover also defines the bleed hole, and particularly to a method of producing the same.

Such diaphragms are fairly small, for example, with an outside diameter of one inch common, and the still smaller inserts present problems in handling and especially in proper positioning of the same within the mold assembly for molding the major rubber parts thereabout. The preferred insert, separately formed of a compatible material which will adequately withstand the rubber molding conditions of temperature and pressure, such as filled nylon, has a center or hub part containing the main diaphragm passage and an ear in which the radially spaced bleed hole is located.

This insert is indexed in feeding the same to the mold, so that the bleed hole will always be located in the same angular position, and the insert and mold assembly are so formed as to cooperably provide assured sealing of the diaphragm openings against obstruction by the rubber or other equivalent composition in the body molding operation.

The above noted advantages are of particular importance in high volume production of the diaphragm, for example, in one hundred cavity molds, and other objects of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a top plan view of a valve diaphragm in accordance with the present invention;

FIG. 2 is a slightly enlarged vertical cross-section of the diaphragm at the plane indicated by the line 2—2 in FIG. 1;

FIG. 3 is a fragmented bottom plan of the central section of the diaphragm as viewed from the plane of line 3—3 in FIG. 2; and FIG. 4 is a partially fragmented vertical section of a mold assembly in which the diaphragm is produced.

Referring now to the drawing in detail, the finished composite diaphragm comprises a body designated generally by reference numeral 10 of flexible rubber or equivalent material in which there is incorporated a relatively hard or rigid insert generally designated by reference numeral 11.

The insert is, as indicated earlier, preferably made of a plastic such as filled nylon and has a center hub part 12, a flat body 13 of circular shape, and a rounded ear 14 as a peripheral projection of the body. There is also an integral semicircular protuberance 15 at the top of the body, near its outer edge and with its ends adjacent the area of the ear 14, and the latter is provided with a cylindrical vertical extension 16 of predetermined height. At the center, the insert has an axial vertical extension 17 to the same height as the ear extension 16 and an axial further protrusion 18 of frusto-conical shape.

A main flow passage 19 is formed axially in the insert with a major extent 20 of enlarged square cross-section at the lower end face of the insert as shown most clearly in FIG. 3 and its cross-sectional size decreasing upwardly along the axis to provide a non-round, upwardly tapering opening for a purpose to be described. The remaining and relatively minor top extent of this central passage is cylindrical and of course terminates at the upper end of the top protrusion 18. The bleed hole 21 for the diaphragm, of noticeably smaller diameter than the diameter of the upper and flow determining part of the central passage, is provided in the ear 14 of the diaphragm and its vertical extension 16.

The flexible body 10 of the diaphragm is molded about the insert 11 and comprises an outer vertical flange 22, an upwardly folded part 23, and a center 24 which conforms to and covers the insert, except for certain areas. These excepted areas are the bottom of the ear and the top of the extension thereof and the top and bottom of the central hub part for exposure respectively of the bleed hole 21 and central passage 19 through the diaphragm. The covering of the semi-circular protrusion 15 forms a flattened ridge which is significantly above the upper end of the bleed hole and serves to preclude blocking of the latter in the event that the diaphragm should in its operation be forced upwardly against an overlying surface.

The production of this diaphragm involves molding the relatively hard plastic insert essentially in its described finished form, but with the significant added provision of small circular beads as shown in FIG. 4 at 25 and 26, respectively about the top and bottom ends of the bleed hole 21 and at 27 about the outer edge or corner of the central axial body extension 17. Considering for convenience the production of the diaphragm in a single cavity mold as shown in such figure, the insert is placed in a lower mold piece 28 which defines the configuration of the underside of the finished diaphragm on a central hardened pin 29 having an upper end 30 which is of tapered square shape and projects into the lower end portion 20 of the axial insert passage. The interfit between pin 29 and such passage serves, with relatively rough guiding of the insert into the assembly, to accurately index its final positioning and locate the ear 14 over a second hardened pin 31 projecting from the mold face into engagement with the bead 26.

A cooperable upper mold piece 32 is fitted with a central pin 33 the lower end of which has a frusto-conical relief 34 of larger size than the similarly shaped protrusion 18 at the top center of the insert and the remaining annular end portion 35 is opposed to the insert top bead 27. The upper mold piece is shaped according to the top configuration of the flexible diaphragm body 10, and there are two sprue holes 36 which extend from the cavity face upwardly to a cylindrical relief or pot 37 in which the rubber 38 or other molding composition for the body is placed as a partially cured sheet.

The operation is one of transfer molding, with a plunger 39 moved against the material 38 to force it through the sprues into the mold cavity and about the insert. However, the two mold pieces are first forced together for closing of the cavity and this action causes the several beads, 25, 26 and 27 to be deformed and thereby seal the areas they respectively encircle against intrusion of the molding compound. The operation thus involves sequentially closing the mold to crush the sealing beads and injection of the molding composition, with the assembly heated to complete curing of the flexible body of the diaphragm.

For production in a one hundred cavity mold, it has been found that an insert loader can be used with holes having rough keyways for the ears of the inserts for the respective cavities and, when the inserts are dropped, for example, by pulling a trap or slide, the non-round interfit provided between the lower ends of the central insert passages and the correspondingly shaped center pins in the cavities automatically assures the exact indexing of the ears as aforesaid. Without proper location of the ears, bleed holes become obstructed by the rubber and these diaphragms are of course defective. While tapered square sections have been shown for such indexing, other cross-sectional shapes which will provide similar coaction might be substituted.

As indicated at the outset, the diaphragm is intended for use in a solenoid operated valve, for example, in which a soft tipped plunger normally engages and seals the upper end of the central diaphragm passage, and the protection of this passage against blockage in the molding operation is also important.

It may be adequate, as in the mold assembly of FIG. 4 at the axial insert passage, to employ a crush bead only at one end of the passage if the opposite end is forced sufficiently against the opposed mold surface. That is, the mold surface at the opposite end acts as an anvil for reaction to the axial force on the part, and the force developed can be great enough that the second bead is not essential.

The damming of the areas at the ends of the axial passage and the bleed hole provided by the insert crush beads in the above-described two step transfer molding operation can be realized with permanent beads or rings on the mold surfaces which project and bite sealingly into the insert at the same lines of engagement with the same.

I, therefore, particularly point out and distinctly claim as my invention:

1. The method of making a valve diaphragm having a rigid insert incorporated within a body of molded flexible material, said insert having at least two appreciably spaced-apart parallel passages therethrough which are exposed and provide in the finished diaphragm passages for fluid flow, which comprises the steps of separately forming the insert with said passages therein, an end portion of one such passage being of non-round cross-sectional shape, placing the thus formed insert in a mold assembly having a cavity which defines the body of flexible material and has a projecting part corresponding to said end portion of said one passage for indexing fit of the latter on the former, thereby to angularly position the other such passage of the insert in the cavity, the mold assembly having surfaces opposed to the sections of the thus indexed insert in which the ends of said passages occur, providing interference between said surfaces and said sections in closing of the mold assembly which seals said sections from the cavity, closing the mold assembly to close the cavity and seal said sections of the insert and hence the passage ends from the cavity, injecting molding composition into the cavity after such closure thereof, and curing the molding composition in the cavity to form the flexible body of the diaphragm with the ends of the rigid insert passages exposed.

2. The method of claim 1, wherein the non-round end portion of said one passage has an inward taper, and the interfitting part of the mold assembly is correspondingly tapered.

3. The method of claim 1, wherein crush beads formed on the insert provide the interference between the mold surfaces and the opposed sections of the insert which seals the latter in the closing of the mold assembly.

* * * * *